United States Patent
Ramaiyer et al.

(10) Patent No.: US 9,536,000 B2
(45) Date of Patent: Jan. 3, 2017

(54) PROFILE PREDICTION FOR SHARED COMPUTERS

(75) Inventors: Viswanathan Ramaiyer, Karnataka (IN); Amit Kumar Verma, Karnataka (IN); Hastagiri Prakash, Karnataka (IN)

(73) Assignee: Excalibur IP, LLC, Sunnyvale, CA (US)

( * ) Notice: Subject to any disclaimer, the term of this patent is extended or adjusted under 35 U.S.C. 154(b) by 525 days.

(21) Appl. No.: 12/915,390

(22) Filed: Oct. 29, 2010

(65) Prior Publication Data

US 2012/0109956 A1 May 3, 2012

(51) Int. Cl.
*G06F 7/00* (2006.01)
*G06F 17/30* (2006.01)
*G06Q 30/02* (2012.01)

(52) U.S. Cl.
CPC ..... *G06F 17/30867* (2013.01); *G06Q 30/0255* (2013.01); *G06Q 30/0269* (2013.01); *G06Q 30/0277* (2013.01)

(58) Field of Classification Search
CPC ............ G06Q 30/0255; G06Q 30/0269; G06Q 30/0277
USPC ............. 707/705, 736, 737; 705/14.4, 14.49, 705/14.52, 14.53, 14.66, 14.67, 14.73
See application file for complete search history.

(56) References Cited

U.S. PATENT DOCUMENTS

| | | | |
|---|---|---|---|
| 7,278,064 B1 * | 10/2007 | Chan | 714/47.3 |
| 7,543,740 B2 * | 6/2009 | Greene et al. | 235/380 |
| 7,594,121 B2 * | 9/2009 | Eytchison et al. | 713/185 |
| 7,743,099 B2 | 6/2010 | Szeto | |
| 7,966,564 B2 * | 6/2011 | Catlin | G06F 17/30867 705/14.43 |
| 2006/0282328 A1 * | 12/2006 | Gerace et al. | 705/14 |
| 2007/0038568 A1 * | 2/2007 | Greene et al. | 705/50 |
| 2008/0077614 A1 | 3/2008 | Roy | |
| 2008/0162397 A1 * | 7/2008 | Zaltzman | 706/48 |
| 2008/0189169 A1 * | 8/2008 | Turpin et al. | 705/10 |
| 2008/0208852 A1 | 8/2008 | Kuttikkad et al. | |
| 2008/0306937 A1 * | 12/2008 | Whilte et al. | 707/5 |
| 2010/0076775 A1 | 3/2010 | Tesler et al. | |
| 2010/0082527 A1 | 4/2010 | Jain | |
| 2010/0211863 A1 * | 8/2010 | Jones et al. | 715/224 |
| 2011/0295892 A1 * | 12/2011 | Evans | G06F 17/30864 707/776 |

OTHER PUBLICATIONS

HTTP cookie, https://web.archive.org/web/20070726073327/http://en.wikipedia.org/wiki/HTTP_cookie, Jul. 26, 2007, 16 pp.*

(Continued)

*Primary Examiner* — Marc Somers
(74) *Attorney, Agent, or Firm* — Brinks Gilson & Lione

(57) ABSTRACT

A profile prediction system may identify one of multiple user profiles for a single computer. For example, a home computer may have multiple users that may not be targeted unless the user on the home computer can be identified. The system's user identification may be based on a clustering model that considers various browsing characteristics to identify different clusters that each correspond to a particular user or user profile. The model may be generated and refined by tracking web browsing over multiple sessions. Future activity on the computer may be used to identify which user is the source of the activity and the user may receive targeted content including advertisements.

14 Claims, 5 Drawing Sheets

(56) References Cited

OTHER PUBLICATIONS

Al-Omary et al., *A new approach of clustering based machine-learning algorithm*; Science Direct, Knowledge-Based Systems 19 (2006) 248-258, www.sciencedirect.com.

* cited by examiner

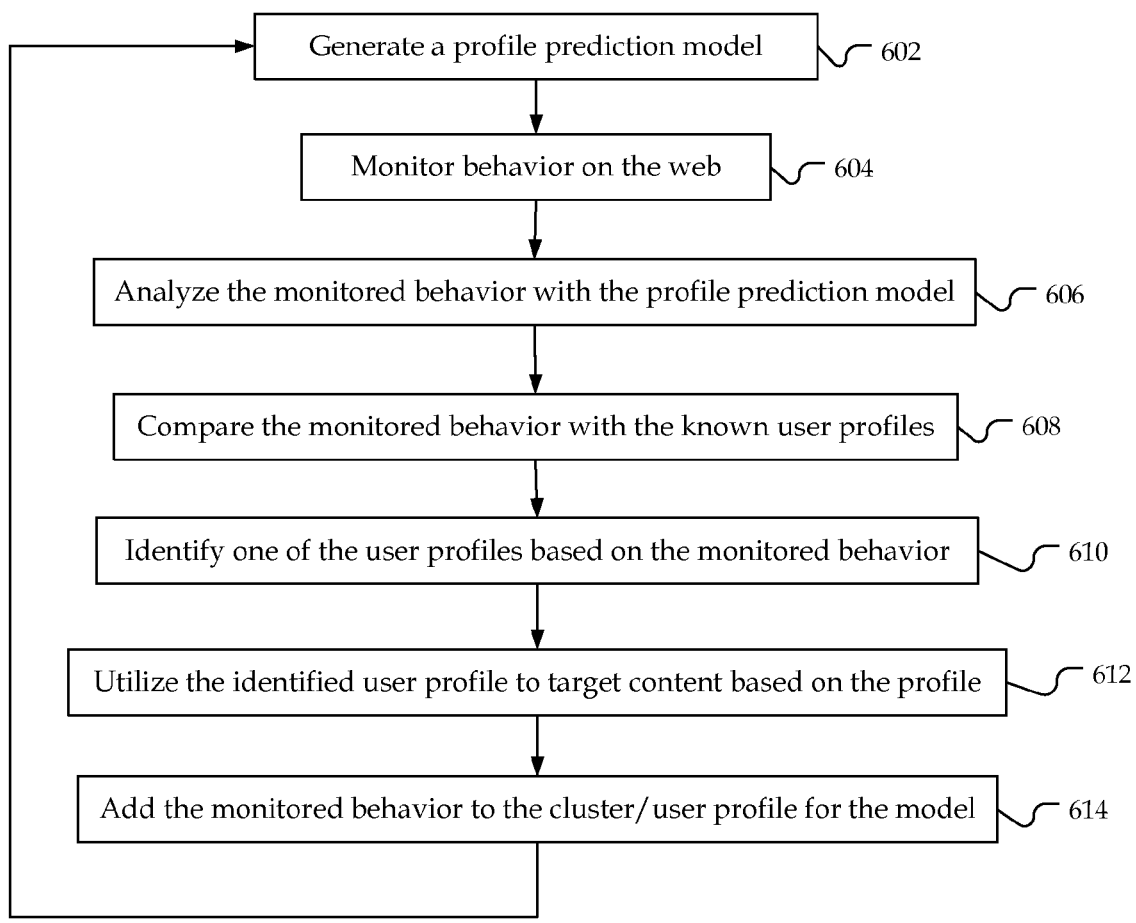

PROFILE PREDICTION FOR SHARED COMPUTERS

BACKGROUND

Targeted online advertising may be an important source of revenue for enterprises engaged in electronic commerce. Processes associated with technologies such as Hypertext Markup Language (HTML) and Hypertext Transfer Protocol (HTTP) enable a web page to be configured to display advertisements. Those advertisements may be targeted based on a user's preferences. In addition to advertisements, other material and resources on a web page may also be targeted for a particular user. Accurate targeting typically requires an identification of a user and knowledge regarding that identified user. The knowledge may include demographics, past browsing history, past purchasing history, or other information that can help to understand a user. In certain situations, it may be difficult to identify a user and/or obtain knowledge regarding that user.

BRIEF DESCRIPTION OF THE DRAWINGS

The system and method may be better understood with reference to the following drawings and description. Non-limiting and non-exhaustive embodiments are described with reference to the following drawings. The components in the drawings are not necessarily to scale, emphasis instead being placed upon illustrating the principles of the invention. In the drawings, like referenced numerals designate corresponding parts throughout the different views.

FIG. 6 is a flowchart for utilizing a prediction model.

DETAILED DESCRIPTION

By way of introduction, a profile prediction mechanism may identify multiple profiles for a single computer. For example, a home computer may have multiple users. Each of the users would need a separate profile for more effective targeting. The presence of multiple users/profiles on a single computer may first be identified and then a profile for each user may then be built based on each user's behavior history and other factors. Future activity on that computer can then be used to identify which user is present and the targeting will be based on that user's profile.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below.

Figure 1:
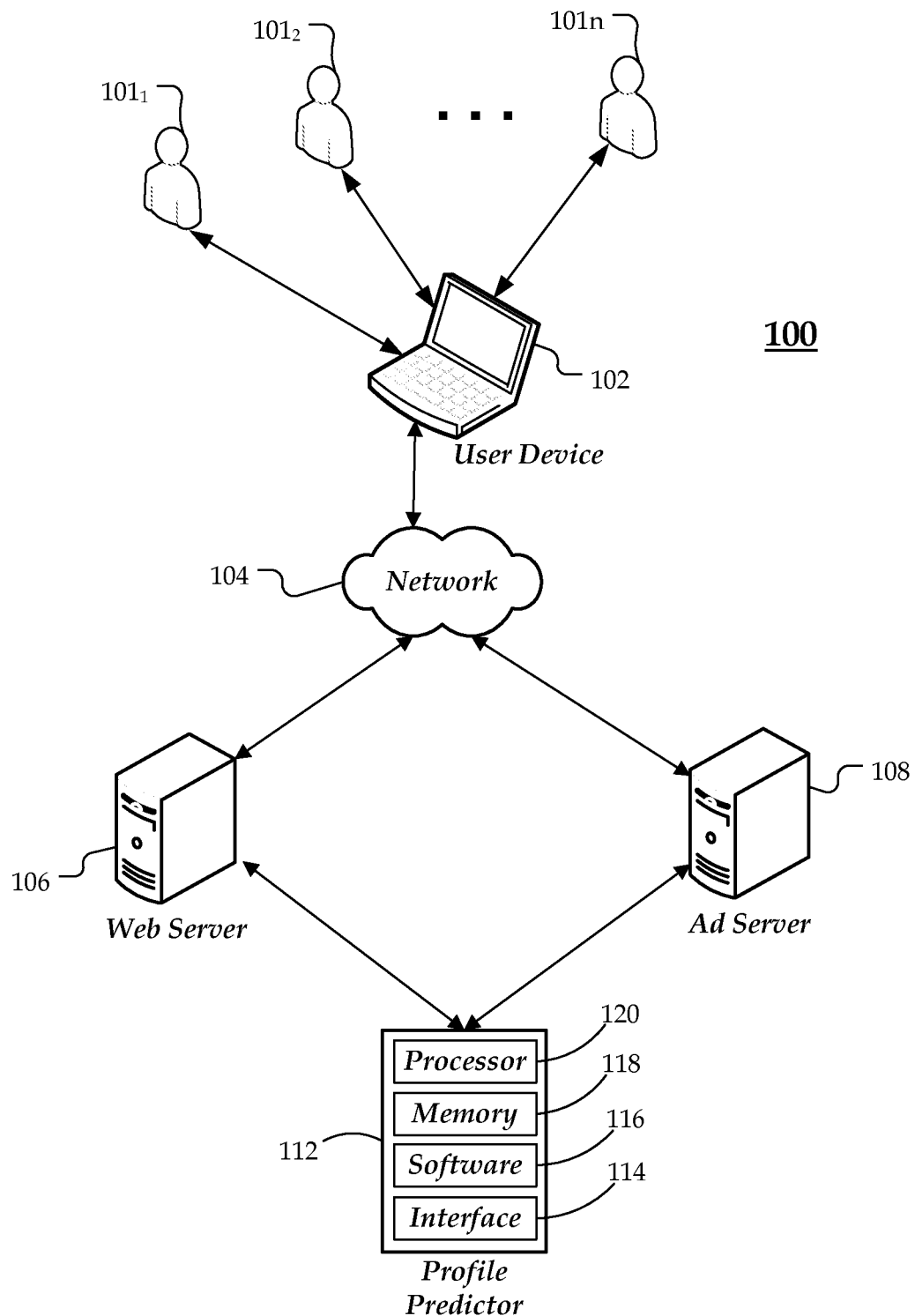
FIG. 1 is a diagram of an exemplary network system.

FIG. 1 depicts a block diagram illustrating one embodiment of an exemplary network system 100. The network system 100 may provide a platform for the identification or prediction of a user by utilizing a user profile for that user. In the network system 100, one or more users $101_{1-n}$ may utilize a user device 102. The profile prediction discussed below may be used to associate a profile with each of the n users $101_{1-n}$ and identify which of the users 101 is utilizing the user device 102. The user device 102 is coupled with a web server 106 and an advertisement ("ad") server 108 through a network 104. A profile predictor 112 may be coupled with the web server 106 and/or the ad server 108. Herein, the phrase "coupled with" is defined to mean directly connected to or indirectly connected through one or more intermediate components, either by hardwired connection or by wireless connection. Such intermediate components may include both hardware and software based components. Variations in the arrangement and type of the components may be made without departing from the spirit or scope of the claims as set forth herein. Additional, different or fewer components may be provided.

The user device 102 may be a computing device which allows a user to connect to a network 104, such as the Internet. Examples of a user device include, but are not limited to, a personal computer, personal digital assistant ("PDA"), cellular phone, or other electronic device. The user device 102 may also be referred to as a source or resource. The user device 102 may be configured to allow a user to interact with the web server 106, the ad server 108, or other components of the network system 100 over the network 104. The user device 102 may include a keyboard, keypad or a cursor control device, such as a mouse, or a joystick, touch screen display, remote control or any other device operative to allow a user to interact with the web server 106 via the user device 102. The user device 102 may be configured to access other data/information in addition to web pages over the network 104 using a web browser, such as INTERNET EXPLORER® (sold by Microsoft Corp., Redmond, Wash.) or FIREFOX® (provided by Mozilla). The data displayed by the browser may include advertisements. In an alternative embodiment, software programs other than web browsers may also display advertisements received over the network 104 from the ad server 108 or from a different source. Although not shown, there may be multiple user devices connected through the network 104 with the web server 106, the ad server 108 and/or other user devices. Each of the other user devices may include a plurality of users that access that user device.

The web server 106 may act as an interface through the network 104 for providing a web page to the user device 102. The web server 106 may provide the user device 102 with any pages that include advertisements and that are requested by a user of the user device 102. In one embodiment, the web server 106 may provide a web page in response to a request from the user device 102 that includes advertisements from the ad server 108. In an alternative embodiment, the web server 106 and the ad server 108 may be combined. The content provided by the web server 106 may be targeted depending on the user 101 that is operating the user device 102. In addition to including advertisements, the content provided by the web server 106 may be a web page and may include text, images, audio, video, other multimedia, or other data.

The ad server 108 may provide advertisements with or as a part of the pages provided to the user device 102. The ad server 108 may provide advertisements to the web server 106 for the page being provided to the user device 102. Those advertisements may be targeted based on the particular user 101 operating the user device. The displayed pages provided to the user device 102 by the web server 106 may include advertising space or advertisement slots that are filled with advertisements provided by the advertisement server 108. In an alternative embodiment, the web server 106 and ad server 108 may be combined and provide content that includes advertisements to the user device 102.

In one embodiment, the web server 106 may include or be coupled with a web database that stores profiles and profile information (e.g. features or characteristics of a profile). A profile may be generated and stored for each of the users 101 that receive pages from the web server 106. In another embodiment, the ad server 108 may include or be coupled with an advertiser ("ad") database that stores advertisements and relevant information for the display of those advertisements. Advertisements, such as images, video, audio, text, banners, flash, animation, or other formats may be stored in the ad database. The ad database may also include records regarding the advertisements that are shown and the resulting impressions, clicks, clickthrough rate (CTR), and/or actions taken for those advertisements. The stored records regarding advertisements may be used for the development of user profiles. In alternative embodiments, the web database and the ad database may be part of a single database, or may be combined with the web server 106 and/or the ad server 108. The profile predictor 112 may utilize information stored in the web database and/or the ad database for generating a profile which in turn is stored in the web database and/or the ad database.

The profile predictor 112 may be used by the web server 106 and/or the ad server 108 for generating, updating, and/or utilizing a profile for various users. The profile predictor 112 may be a part of the web server 106 and/or a part of the ad server 108. The profile predictor 112 may analyze characteristics as discussed with respect of FIG. 3 for generating and utilizing a user profile. The profile predictor 112 may also analyze behavior (e.g. behavior 202 and FIG. 4) at the user device 102. The characteristics and behavior may include or relate to ad information from the ad server 108 and/or content from the web server 106. The analysis performed by the profile predictor 112 may include clustering behavior for different sessions of interactions with the user device 102. Based on the clusters, the profile predictor 112 can develop user profiles for each of the users 101 of the user device 102. Utilizing that information, the profile predictor 112 can then identify which user 101 is on a user device 102. This profile generation and identification is further described with respect to FIGS. 5-6.

The profile predictor 112 may be a computing device for generating a user profile or identifying a user based on behavior at the user device 102. The profile predictor 112 may include a processor 120, a memory 118, software 116 and an interface 114. The profile predictor 112 may be a separate component from the web server 106 and/or the ad server 108, or they may be combined as a single component or hardware device.

The processor 120 in the profile predictor 112 may include a central processing unit (CPU), a graphics processing unit (GPU), a digital signal processor (DSP) or other type of processing device. The processor 120 may be a component in any one of a variety of systems. For example, the processor 120 may be part of a standard personal computer or a workstation. The processor 120 may be one or more general processors, digital signal processors, application specific integrated circuits, field programmable gate arrays, servers, networks, digital circuits, analog circuits, combinations thereof, or other now known or later developed devices for analyzing and processing data. The processor 120 may operate in conjunction with a software program, such as code generated manually (i.e., programmed).

The processor 120 may be coupled with the memory 118, or the memory 118 may be a separate component. The software 116 may be stored in the memory 118. The memory 118 may include, but is not limited to, computer readable storage media such as various types of volatile and non-volatile storage media, including random access memory, read-only memory, programmable read-only memory, electrically programmable read-only memory, electrically erasable read-only memory, flash memory, magnetic tape or disk, optical media and the like. The memory 118 may include a random access memory for the processor 120. Alternatively, the memory 118 may be separate from the processor 120, such as a cache memory of a processor, the system memory, or other memory. The memory 118 may be an external storage device or database for storing recorded ad or user data. Examples include a hard drive, compact disc ("CD"), digital video disc ("DVD"), memory card, memory stick, floppy disc, universal serial bus ("USB") memory device, or any other device operative to store ad or user data. The memory 118 is operable to store instructions executable by the processor 120.

The functions, acts or tasks illustrated in the figures or described herein may be performed by the programmed processor executing the instructions stored in the memory 118. The functions, acts or tasks are independent of the particular type of instruction set, storage media, processor or processing strategy and may be performed by software, hardware, integrated circuits, firm-ware, micro-code and the like, operating alone or in combination. Likewise, processing strategies may include multiprocessing, multitasking, parallel processing and the like. The processor 120 is configured to execute the software 116.

The interface 114 may communicate with any of the user device 102, the web server 106, and/or the ad server 108. The interface 114 may include a user interface configured to allow a user and/or an administrator to interact with any of the components of the profile predictor 112. For example, the administrator and/or user may be able to review or update the behavior or characteristics that are analyzed for the user profile. The interface 114 may include a keyboard, keypad or a cursor control device, such as a mouse, or a joystick, touch screen display, remote control or any other device operative to allow a user or administrator to interact with the profile predictor 112. The interface 114 may include a display coupled with the processor 120 and configured to display an output from the processor 120. The display may be a liquid crystal display (LCD), an organic light emitting diode (OLED), a flat panel display, a solid state display, a cathode ray tube (CRT), a projector, a printer or other now known or later developed display device for outputting determined information. The display may act as an interface for the user to see the functioning of the processor 120, or as an interface with the software 116 for providing input parameters.

The present disclosure contemplates a computer-readable medium that includes instructions or receives and executes instructions responsive to a propagated signal, so that a device connected to a network can communicate voice, video, audio, images or any other data over a network. The interface 114 may be used to provide the instructions over the network via a communication port. The communication port may be created in software or may be a physical connection in hardware. The communication port may be configured to connect with a network, external media, display, or any other components in system 100, or combinations thereof. The connection with the network may be a physical connection, such as a wired Ethernet connection or may be established wirelessly as discussed below. Likewise, the connections with other components of the system 100 may be physical connections or may be established wirelessly.

Any of the components in the system 100 may be coupled with one another through a network, including but not limited to the network 104. For example, the profile predictor 112 may be coupled with the web server 106 and/or the ad server 108 through a network. Accordingly, any of the components in the system 100 may include communication ports configured to connect with a network. The network or networks that may connect any of the components in the system 100 to enable communication of data between the devices may include wired networks, wireless networks, or combinations thereof. The wireless network may be a cellular telephone network, a network operating according to a standardized protocol such as IEEE 802.11, 802.16, 802.20, published by the Institute of Electrical and Electronics Engineers, Inc., or WiMax network. Further, the network(s) may be a public network, such as the Internet, a private network, such as an intranet, or combinations thereof, and may utilize a variety of networking protocols now available or later developed including, but not limited to TCP/IP based networking protocols. The network(s) may include one or more of a local area network (LAN), a wide area network (WAN), a direct connection such as through a Universal Serial Bus (USB) port, and the like, and may include the set of interconnected networks that make up the Internet. The network(s) may include any communication method or employ any form of machine-readable media for communicating information from one device to another. As discussed, the ad server 108 or the web server 106 may provide advertisements and/or content to the user device 102 over a network, such as the network 104.

Figure 2:
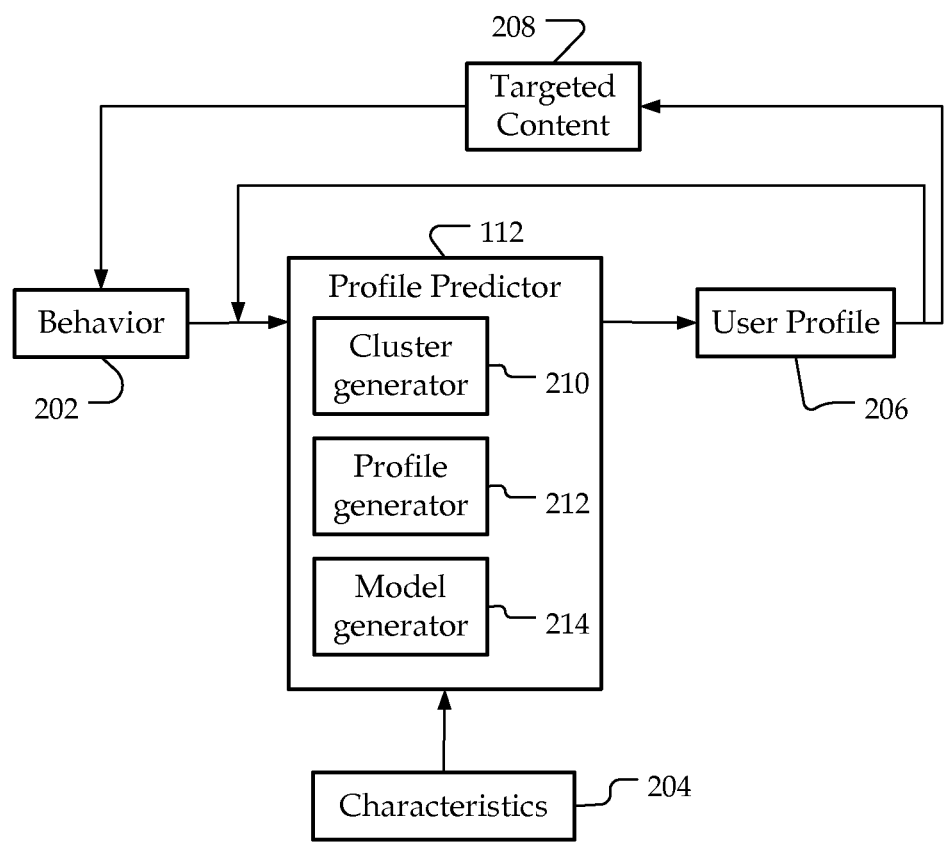
FIG. 2 is a diagram of an alternative exemplary system.

FIG. 2 is a diagram of an alternative exemplary system. The profile predictor 112 utilizes characteristics 204 from a source (e.g. the user device 102) for generating a user profile 206 and analyzes behavior 202 from that source (e.g. the user device 102) to identify the user profile 206. The user profile 206 may be used for providing targeted content 208 in response to the behavior 202. The user profile 206 may include age or age group, gender, occupation, income, education, marital status, familial status, behavior, shopping history, or other interests for targeting.

The profile predictor 112 may include a cluster generator 210, a profile generator 212, and a model generator 214. The generators 210, 212, 214 may be individual computing devices or may be combined in one device the performs different functions. As described below with respect to FIG. 5, the cluster generator 210 generates clusters of sessions, the profile generator 212 generates profiles for the clusters, and the model generator 214 generates a model for predicting a user/profile based on certain behavior.

Figure 3:
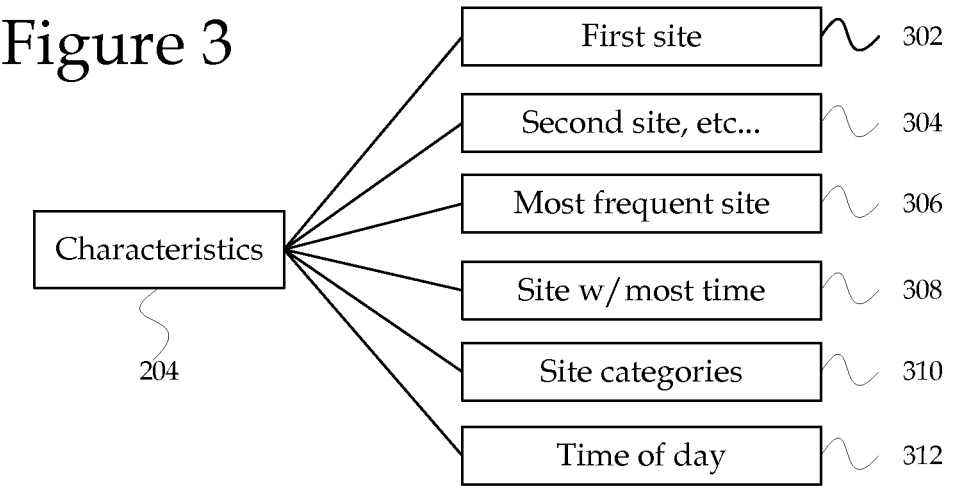
FIG. 3 is a diagram of exemplary characteristics for prediction.

FIG. 3 is a diagram of exemplary characteristics for prediction. In one embodiment, the profile predictor 112 monitors or tracks user characteristics 204 to generate the user profile 206. The characteristics 204 may also be referred to as features or parameters that are measurable from a user device 102 and used to distinguish between multiple users 101. The first site visited 302 is a relevant characteristic because individual users commonly visit the same site for each of their browsing sessions. For example, the first site may be email, weather, stocks, news, or shopping. Each of the users of a particular device may visit a different first site 302. The first site 302 can then be used for identifying which user is utilizing the device. The second site 304 or subsequent numbered sites may also be recorded for each session on the user device 102. Just as a user may have visit the same first site when they are browsing the web, they might follow a pattern of first checking email, then moving on to social networking or sports. Tracking a user's first site, second site, third site, etc. may be used for identifying that user.

The frequency of visits to a site and time spent on a particular may be relevant characteristics 204, such as the site visited most frequently 306. This may be a site that is checked on every session that the user has. For example, a parent on a home computer may check email on every session, but a child utilizing that home computer may check WEBKINZ™ on every session. Likewise, the site with the most time 308 is another relevant characteristic. A child on a home computer may spend most of their sessions on games, while an adult may spend most of their sessions on shopping. The site popularity for a particular session may be useful in predicting the identity of a user because users tend to repeat certain tasks in each of their browsing sessions. Time spent on any number of sites may be a further characteristic rather than just the site with the most time 308.

In addition, to tracking the sites of a session, the category or type of site 310 may also be relevant. One user may spend the majority of their time browsing sports related sites, while another user may spend time on technology sites and blogs. The common or popular category of sites that a user visits may be part of the generated user profile 206. Further, the time spent on a particular category may also be a consideration. Finally, the time of day 312 may be indicative of the user. For example, a child may utilize the home computer after school, but the parent utilizes that computer later in the evenings. This time of day may be a further indication of the user.

Figure 4:
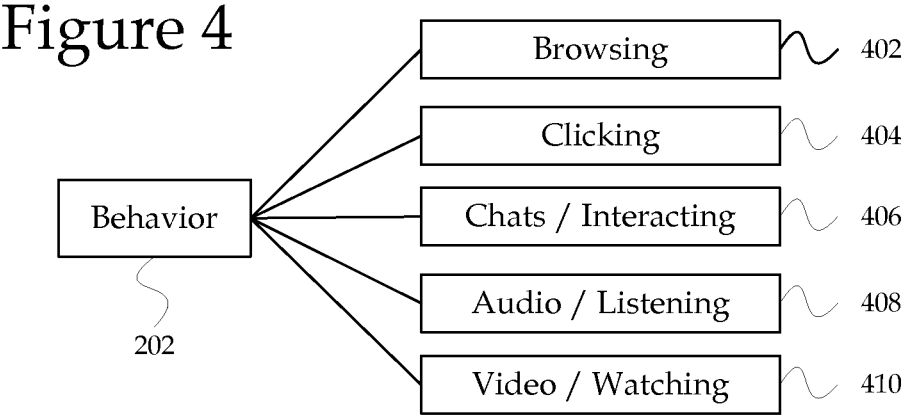
FIG. 4 is a diagram of exemplary behavior for tracking and targeting.

FIG. 4 is a diagram of exemplary behavior for tracking and targeting. In one embodiment, the profile predictor 112 may monitor or track behavior on the user device 102 to predict the particular user of the device based on the behavior. In one embodiment, the behavior includes the characteristics 204 discussed above. The behavior 202 includes browsing 402. Each site that is visited is part of the browsing history of a session. In addition, what the clicking history 404 is another example of user behavior 202. Chatting or interacting 406 is another web behavior that may be monitored and/or analyzed. A user can also listen to audio 408 and watch video 410 as additional user behavior 202.

Referring back to FIG. 2, the user profile 206 may be used for identifying the user and the content that is provided in response to the behavior 202 will be targeted content 208 that is targeted for the identified user. For example, a user that is browsing, clicking, interacting, listening, and/or watching a particular site may be identified based on that behavior 202 or based on the measured characteristics 204 and in response to that behavior 202, the profile predictor 112 identifies a user profile 206 for that user and the behavior 202 results in content that is targeted 208 for that user. In one embodiment, the targeted content 208 may include targeted advertisements on the page. In another embodiment, the targeted content 208 may include other content of the web page, such as recommendations of other pages (or links, articles, images, audio, video, etc.).

Figure 5:
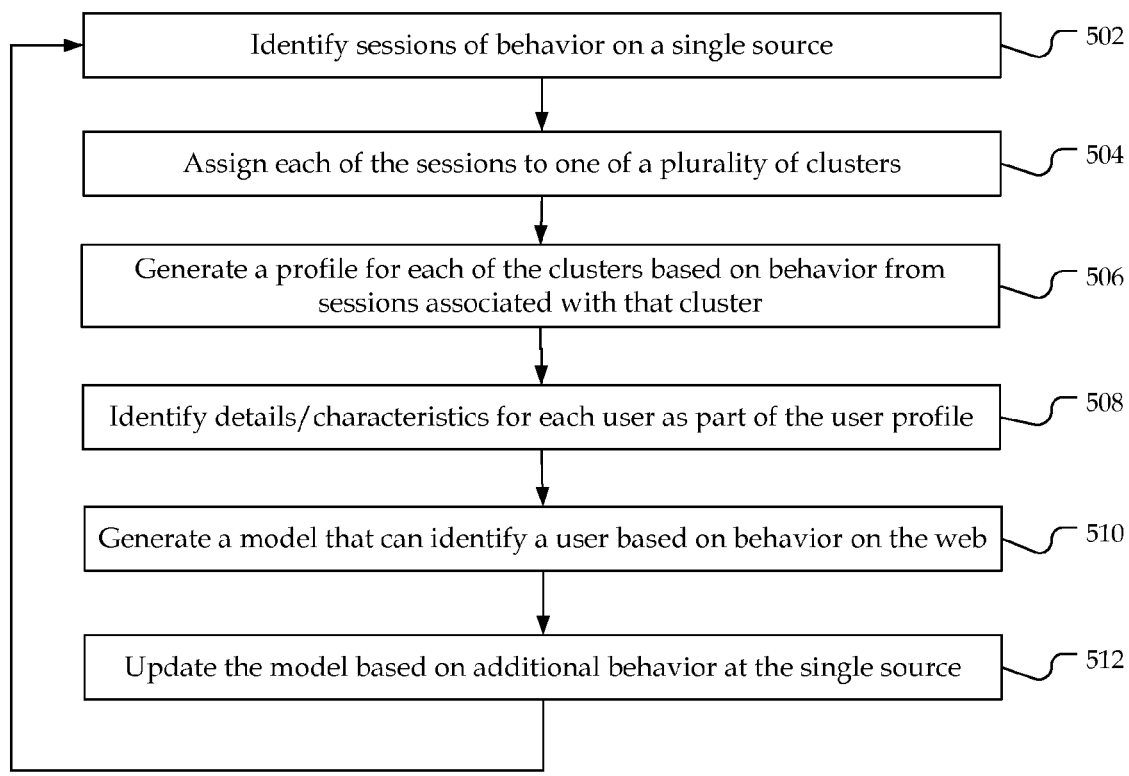
FIG. 5 is a flowchart for generating a prediction model.

FIG. 5 is a flowchart for generating a prediction model. In block 502, sessions of behavior are identified on a single source. For example, on a home computer each browsing session is identified and tracked. A browsing session may be defined by having less than 30 minutes of inactivity. In other embodiments, the period of inactivity may be more or less, such as 10 minutes. In other words, if there is no activity on a home computer for at least 10 minutes, then it can be assumed that the next activity starts a new session. The single source may have multiple users, so identification of sessions may be necessary to identify the users. The session tracking may monitor activity from a particular internet protocol ("IP") address. In alternative embodiments, a session identification cookie may be utilized to determine when a session begins and ends.

In block 504, a clustering algorithm may be used to group the sessions into clusters. The clustering may be used to group sessions together such that each cluster of sessions is associated with a different user. If the clustering algorithm identifies four clusters from the sessions over a period of time, then it may be assumed that there are four users and each user is associated with one of the clusters. The clustering algorithm may treat each session as a data point and extract the characteristics of the sessions from each cluster. The clustering algorithm may include conceptual clustering (e.g. COBWEB) which may also generate characteristic descriptions of the different clusters. Alternatively, a CLASSIT algorithm is an extension of COBWEB that can be used for incremental clustering of continuous data. The extracted characteristics of each cluster may be used for generating a user profile associated with that cluster in block 506. The user profile may include any behavior recorded from the cluster of sessions it is associated with.

Each of the clusters may have an associated user profile that is representative of each user. In block 508, characteristics for each user are identified based on the clusters for the user profile. The characteristics may include the characteristics 204 described with respect to FIG. 3. For example, the sites that are visited may be relevant for the clustering. The sites may be classified for improving the clustering algorithm accuracy. In particular, sites may be categorized as head, torso, and tail. Head is the common or general sites, while tail are very specific and less common sites. Torso are mid-range sites. For example, email or FACEBOOK® would be head sites while a friend's blog would be a tail site. The clustering algorithm will be more accurate using tail sites because it may be easier to differentiate clusters by tail sites.

Utilizing the cluster data and associated characteristics, a model is generated in block 510. The model may be referred to as a profile prediction model and may be used for identifying a user or user profile based on a user's behavior as discussed with respect to FIG. 6. The model may be generated based on a Bayesian model that gives a probability of a current user belonging to a particular cluster based on the current user's monitored action. The model may be a learning algorithm that improves as more data is input. As the user device 102 continues to be used, the behavior on the device is tracked and used to update the clusters and update the model as in block 512. Subsequent behavior at the user device 102 may be analyzed to identify the user profile as discussed with respect to FIG. 6, but may also be used for improving the model with the additional session data added to an existing cluster or forming a new cluster.

The profile prediction model may be stored in a cookie client side or may be stored server side. In the server side embodiment, when the user device 102 is connected to the web server 106, the stored profile prediction model can be associated with the device based on IP address or based on the presence of a session identification cookie. The model can be updated with the additional behavior at the user device 102 or the model can be used for identifying the user.

FIG. 6 is a flowchart for utilizing a prediction model. A profile prediction model can be used on active/ongoing browsing sessions to identify the user of that session. As discussed, a single computer may have multiple users and the profile prediction model may be used for identifying which of the multiple users is currently using the computer so that user can be properly targeted. The profile prediction model may be a Bayesian model that provides a probability that a user belongs to a particular cluster as that user browses a site. In block 602, the profile prediction model is generated as discussed with respect to FIG. 5. In block 604, a user's behavior is monitored or tracked. The model is used to analyze the monitored behavior in block 606 and compare the user's behavior with the known user profiles in block 608. In particular, the model may utilize characteristics associated with the user profiles to compare with the characteristics of the current browsing session. The model can adapt based on the current browsing information by giving importance to those characteristics most likely to improve the probability of associating the current browsing with a user profile.

The model provides a probability that the user belongs to a particular cluster based on the monitored behavior. The identification of a cluster corresponds to a user profile as in block 610. Utilizing the identified user profile, the user's current behavior can be targeted in block 612. In particular, advertisements can be targeted to the user based on that user's user profile. As the user continues to browse, that monitored behavior is used to refine the model in block 614. As the user continues to browse, that browsing history is used as part of another session that is added to a cluster. As more information is known about the browsing of a user, the identification of that user may become more accurate. In other words, the probability of the Bayesian model may increase as a user continues to browse.

The system and process described may be encoded in a signal bearing medium, a computer readable medium such as a memory, programmed within a device such as one or more integrated circuits, and one or more processors or processed by a controller or a computer. If the methods are performed by software, the software may reside in a memory resident to or interfaced to a storage device, synchronizer, a communication interface, or non-volatile or volatile memory in communication with a transmitter. A circuit or electronic device designed to send data to another location. The memory may include an ordered listing of executable instructions for implementing logical functions. A logical function or any system element described may be implemented through optic circuitry, digital circuitry, through source code, through analog circuitry, through an analog source such as an analog electrical, audio, or video signal or a combination. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine readable medium," "propagated-signal" medium, and/or "signal-bearing medium" may comprise any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

We claim:

1. A non-transitory computer readable medium having stored therein data representing instructions executable by a programmed processor for identifying a user profile from a single source with multiple users and multiple user profiles, the storage medium storing instructions operative for:
    identifying clusters of behavior from the multiple users of a single source using a session identification cookie to analyze a browsing history using tail sites and not using head sites to improve differentiation of clusters;
    analyzing each of the clusters using a profile prediction model with a second cookie that stores the profile prediction model at the single source, the second cookie different from the session identification cookie;
    developing a profile for each of the clusters from the session identification cookie based on the analysis of the clusters with the second cookie, wherein each of the multiple users are associated with one or more of the clusters;
    monitoring behavior at the single source to identify one of the clusters based on the behavior, wherein the identified cluster is associated with one of the users of a developed profile for that identified cluster;
    updating the profile prediction model based on the monitored behavior; and
    targeting content based on the developed profile for that identified cluster.

2. The computer readable medium of claim 1 wherein the single source comprises a single computing device.

3. A system for identifying a user on a shared computing source comprising:
    a web server coupled with a network and configured to receive requests from the source and return a page to the source in response to each of the requests;
    an ad server coupled with the network and configured to provide advertisements with the pages returned in response to the requests;
    a profile predictor comprising at least one processor, the profile predictor being coupled with the web server and the ad server and configured to analyze the requests with the at least one processor, the profile predictor comprising:
        a cluster generator that analyzes sessions of the requests using a first cookie on the shared computing source and assigns each of the sessions to one of a plurality of clusters based on a browsing history using tail sites rather than head sites for more accuracy in clustering by the cluster generator;
        a profile generator that determines characteristics for each of the clusters and generates a profile for each of the clusters that includes the determined characteristics for that cluster; and
        a model generator that produces a model for associating a profile with requests received at the web server, wherein the model provides a probability that each of the users of the shared computing source belong to a particular cluster based on the determined characteristics.

4. The system of claim 3 wherein the model is stored with a second cookie and further wherein the first cookie and the second cookie are accessed from a web browser with the shared computing source.

5. The system of claim 3 wherein the source comprises a computer that is accessible by multiple users and the multiple users are each associated with one of the generated profiles.

6. The system of claim 5 wherein the model identifies one of the multiple users based on requests received at the web server.

7. The system of claim 3 wherein the ad server provides targeted advertisements in response to received requests that are targeted based on identifying a profile for those requests.

8. The system of claim 3 wherein response from the web server to the requests utilizes the model to target content for those requests based on profile associated with those requests.

9. The system of claim 3 wherein the generated profiles each comprise characteristics further including a first site visited, a second site visited, a most frequent site, a site with most time spent, site categories browsed, and/or time of day.

10. The system of claim 9 wherein the characteristics of the requests received at the web server are analyzed with the model for matching with one of the profiles.

11. The system of claim 3 wherein the generated profiles each comprise behavior data.

12. The system of claim 11 wherein the behavior data comprises browsing history, click history, or multimedia usage.

13. A method for identifying and predicting users of a computer, the method comprising:
    generating a model that identifies the users, the generating comprising:

analyzing a plurality of sessions from the users on a single computer;

clustering the sessions based on one or more tail sites or torso sites visited during the particular session rather than head sites to improve differentiation of clusters;

generating a profile for each of the clusters, wherein each of the profiles is associated with one of the users; and producing a model that associates common characteristics with the profile;

storing the model at least partially in a cookie on the computer; and identifying, from the stored model, an active user from the users, the identifying comprising:

receiving requests from the computer;

analyzing, with the stored model, the common characteristics of the requests;

predicting the user submitting the requests from the computer based on the analysis; and updating the stored model based on the requests and the analysis.

14. The method of claim 13 further comprising:

targeting the predicted user based on the profile associated with that user, wherein the targeting comprises targeted advertisements displayed in response to the requests.

* * * * *